Figure 1:
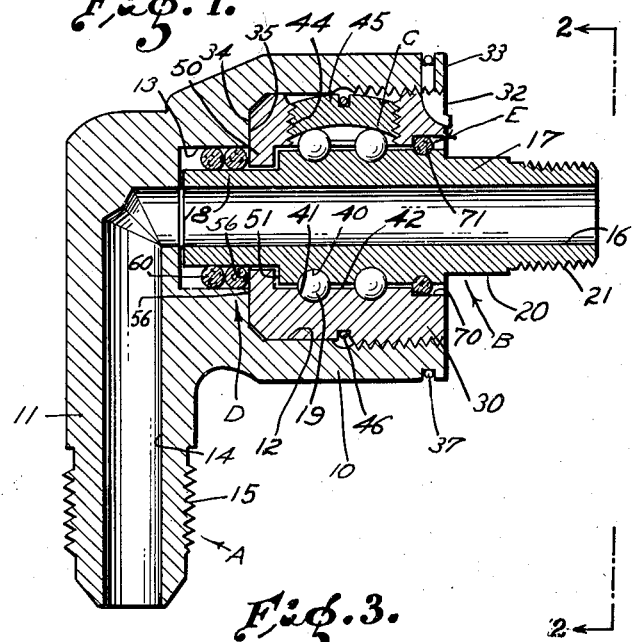

Nov. 29, 1949      D. WARREN      2,489,441

SWIVEL CONNECTION

Filed June 8, 1944

INVENTOR.
Doyle Warren
BY
Attorney

Patented Nov. 29, 1949

2,489,441

UNITED STATES PATENT OFFICE 2,489,441

SWIVEL CONNECTION

Doyle Warren, Monrovia, Calif., assignor to Chiksan Tool Company, Brea, Calif., a corporation of California Application June 8, 1944, Serial No. 539,293

3 Claims. (Cl. 285—97.3)

1

This invention has to do with a swivel connection for handling fluids and it is a general object of the invention to provide a simple, effective and improved device of this general character.

Swivel connections are employed on conduits handling fluids of various kinds and are in common use on aircraft where weight is an important factor. The usual swivel joint or swivel connection for handling fluids involving bearings which enable the joint to operate freely is complex and expensive of manufacture. Further, in the usual swivel joint construction the parts are arranged and related so that there is a substantial end thrust tending to separate the sections of the connection, thus placing strains on the bearings or creating substantial friction which resists movement of the joint. Further, the usual swivel connection or swing joint is such as to require that the sections be formed of steel or comparable metal and, consequently, the devices are heavy.

It is a general object of my present invention to provide a fluid connection or swivel joint that is simple and inexpensive of manufacture and yet effective in operation. In the device of the present invention the parts are connected through a simple ball bearing support and the bearing serves to retain the sections together and yet is not subject to excessive end or lateral thrust.

Another object of this invention is to provide a joint construction of the character referred to in which the wearing parts are small and compact, and can be made of steel or the like, while the large or bulky element of the construction is adapted to be made of light metal. As a result of the construction that I have provided the device has durable, wearing parts giving the device a long, dependable life and yet the total construction is very much lighter than is a joint of comparable size made in accordance with the usual practice.

Another object of this invention is to provide a device of the general character referred to in which the bearing or working parts are assembled as a unit and are then applied to the finished construction. With the construction of the present invention the proper fit and relationship of the relatively moving parts can be established preliminary to assembly of the finished construction, making the device such that it does not require careful or delicate adjustment in the final assembly.

Another object of my invention is to provide

2 a device of the general character referred to which is such as to allow it to be very closely coupled to a conduit, or the like, thus minimizing space which is highly important in some situations.

Figure 2:
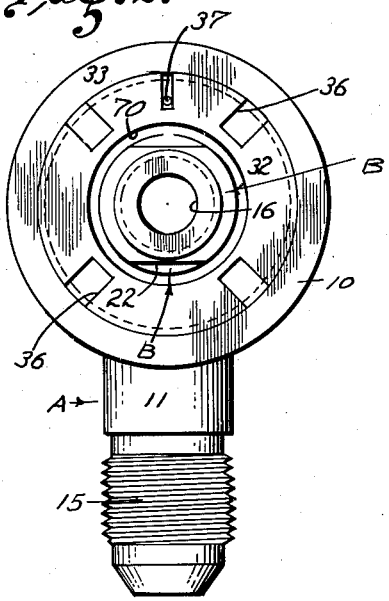
Figure 3:
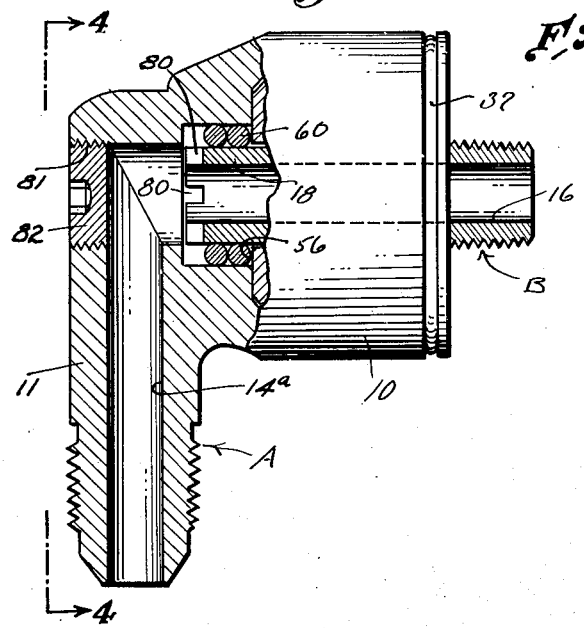
Figure 4:
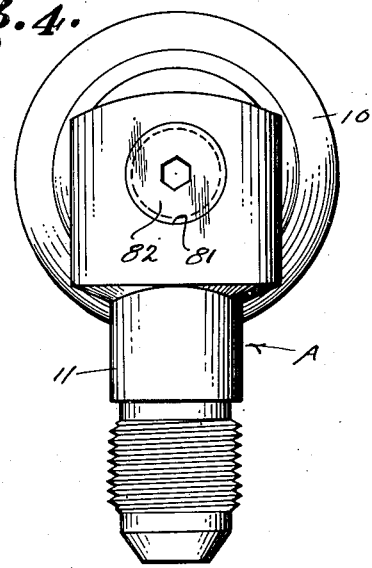

The various objects and features of my invention will be fully understood from the following detailed description of typical preferred forms and applications of the invention, throughout which description reference is made to the accompanying drawings, in which:

Fig. 1 is a longitudinal detailed sectional view of a construction embodying my invention. Fig. 2 is a view taken as indicated by line 2—2 on Fig. 1. Fig. 3 is a side view of another form of the invention with certain parts broken away to show in section, and Fig. 4 is a view taken as indicated by line 4—4 on Fig. 3.

The device of the present invention involves, generally, two sections A and B assembled with bearing means C and packing means D and E to form or establish a rotary connection useful in a fluid conduit, or the like, the connection being such as to allow the sections A and B to be connected with fluid conduits or other like elements and allowing free relative rotation between the sections A and B.

The section A is the outer or female section of the construction and involves, generally, a socket portion 10 and a lateral extension 11 joining the inner end of the socket. The section B, which is the inner or male section of the construction, is carried in the socket 10 so that it has an outer end projecting from the socket for connection with a fluid conduit or the like.

The female section A is preferably an integral unit in the form of a casting, or the like. The socket 10 of the female section has an opening 12 sufficiently large in diameter to receive the assembly formed by the male section B and bearing means C and sufficiently deep to completely receive the bearing means and to receive all of the male section B except the outer projecting end which will be hereinafter described. The inner end of the socket or of the opening 12 in the socket is counterbored at 13 to accommodate the packing means D. The extension 11 of the female section is a lateral extension or projection at the inner end of the socket 10 having a fluid passage 14 which communicates with the bottom of the counterbore 13 so a fluid connection is established between the extension 11 and the male section B of the joint. The outer or projecting end portion of the extension 11 may be threaded at 15 for the reception of a suitable coupling or the like, It is to be understood, of course, that the exact disposition and proportioning of the parts just described can, in practice, be varied to suit the conditions encountered.

In the preferred form of the invention the female section A which forms the principal or largest element of the construction is formed of light material, such as a light metal or an alloy of light metals. As an example, the female section may be cast or otherwise formed of an aluminum alloy, such material being light and inexpensive and yet sufficiently strong to carry the other parts, as will be hereinafter described.

The male section B of the construction is a simple elongate tubular member having a straight central fluid-carrying opening 16 which communicates with the opening 14 in section A and which conducts fluid without restriction or eddy currents.

In the preferred form of the invention the male section B has several portions or sections all of which can be easily formed by simple turning of the exterior of the section. In the case illustrated the section B has a principal part or body 17 that is carried within the socket of the female section, a reduced inner end extension 18 at the inner end of the body which extends into the counterbore 13, and an outer end extension which projects outward of or beyond the open end of the socket 10 in section A. In the form of the invention shown in Figs. 1 and 2 the outer projecting end of the section B has a wrench part 20 adjacent the end of the socket 10 and a threaded part 21 beyond the wrench part adapted to receive a coupling, or the like. The wrench part 20 may, in practice, be round and adapted to be engaged by a pipe wrench, or the like, or it may have flattened sides 22 to be engaged by a suitable tool to facilitate holding or turning.

The bearing means C of the construction involves a ring 30 which surrounds the body 17 of the male section B and seats entirely within the socket 10 of the female section A, and rows of balls 19 which support the ring 30 on the body 17. In accordance with my invention I provide for the retention of the ring 30 in the socket. Any suitable means may be provided for this purpose. However, I prefer in practice to provide a screw thread in the outer portion of the socket opening 12 and I provide a thread on the exterior of the ring so that the ring is threaded in the socket, as will be apparent from Fig. 1 of the drawings. I relate the ring to the socket so that when it is threaded completely into the socket so that its outer end 32 is flush wih the outer end 33 of the socket its inner end 34 is in abutting engagement with the bottom 35 of the socket. Suitable wrench or tool openings 36 may be provided in the outer end 32 of the ring to facilitate its being threaded into or removed from the socket. It is to be noted that the threaded engagement between the ring and the socket is on a rather large diameter, making it convenient to have the threads rather coarse, which is practical and most advantageous when employing a soft material in one of the parts, as for instance in the section A. A suitable lock wire or ring 37 may be provided for locking the ring in the socket so that it cannot accidentally work loose.

The balls 19 which support the ring on the body 17 are arranged in annular series, preferably two series. The balls are seated in suitable races 40 provided in the exterior of the body 17 and fit into corresponding races 41 provided in the inner wall 42 of the ring. The balls may be arranged in place through an opening 44 normally closed by a removable plug 45. A lock ring 46 may be engaged around the ring 30 through a notch in the plug 45 to lock the plug against displacement.

In accordance with my invention an inwardly extending flange 50 is provided on the inner end of the ring 30 to overlie the inner end 51 of the body 17 and to close or form a wall 56 at the mouth of the counterbore 13 thus closing the counterbore. It is to be noted that the several parts of the ring, that is, the ring proper and its flange 50, surround and fit the body parts with suitable clearance so that the ring is wholly supported from the body on the balls 19.

The packing means D is carried in the counterbore 13 and preferably involves one or more annular bodies of packing 60 round in cross section and proportioned so that they bear on the section 18 and have sealing contact with the wall of the counterbore 13. These rings may be formed of rubber or rubber-like compositions. Where oils or the like are being handled it is preferred to employ synthetic material in the packing rings 60 to resist corrosion or deterioration. The packing rings fit snugly around extension 18 of section B and at the same time bear against the wall of counterbore 13, thus sealing off any leakage of fluid from the inner passage 16 to the outside of the connection. The packing rings can move longitudinally in the counterbore, which allows them to shift and accommodate themselves as pressures occur on the structure. The pressure of fluid being handled by the connection will enter the counterbore 13 and bear on the packing rings 60 urging them out in the counterbore so that they bear against the wall 56 established by the flange 50. Through this arrangement the end thrust on the packing rings 60, being taken by the flange 50, is communicated to the body section A so that it does not tend to displace the male section B from the female section A and consequently does not create end thrust.

The packing means E is located at the outer end of the body or between the outer end portion of the ring 30 and the body 17. The ring may be counterbored at 70 and a packing ring 71 may be carried in a suitable groove in the body 17 to have sealing engagement with the wall of the counterbore. This packing is ordinarily not required to handle any particular pressure and merely serves to retain lubricant between the ring and the body to keep proper lubricant present at the balls 19 and prevents foreign matter from entering between the ring and the body.

In employing the construction above described the body section B with the ring 30 thereon, and with the balls 19 between the ring and the body and with the packing rings 60 and 71 in place, can be assembled as a unit before being applied to the female section A. This allows for the proper assembly and adjustment of the principal working parts and where they are readily accessible. The unit or assembly thus established is easily applied to the female section A by screw threading the ring into the socket. When the ring is completely seated in the socket it, in effect, becomes solid or rigid therewith and is locked in place by the locking ring 37. The male section can be applied to a suitable conduit or the like by engaging the wrench part 20 and turning or holding it as circumstances require. It will be apparent how a suitable fluid connection can be made with the part 15 of the extension 11.

In the form of the invention shown in Figs. 3 and 4 the male section B corresponds with that above described, except that it is formed without a wrench part 20 projecting from the open end of the socket, while the extreme inner end of the extension 18 is provided with notches 80, or the like, for the reception of a suitable wrench or tool. As a result of this construction the threaded part 21 of the male section B adjoins or is immediately adjacent the end of the body section A. The body section A may be formed substantially as hereinabove described, except that the extension 11 is provided with an opening 81 communicating with the opening 14ª opposite and in communication with the inner end of the male section B. A plug 82 normally closes the opening 81. This form of the invention can be handled the same as that above described, except that to apply the male section B to a conduit or the like the plug 82 is removed and a suitable tool introduced through the opening 81 to engage the notches 80 to hold or operate the male sections B as circumstances require. When the male section has been tightly connected to the desired part such as a conduit or the like, the plug 82 is returned to its normal position, closing the opening 81. It will be observed that this form of the invention allows for mounting of the connection immediately adjacent the end of a fluid conduit or other object so that there is not even the clearance incidental to a wrench part such as the part 20 in the form of the invention shown in Fig. 1. This is an important feature of some situations where space is limited.

Having described only typical preferred forms and applications of my invention I do not wish to be limited or restricted to the specific details herein set forth, but wish to reserve to myself any modifications or variations that may appear to those skilled in the art or fall within the scope of the following claims.

Having described my invention, I claim:

1. A fluid connection of the character described including, an outer fluid carrying section having a socket in it from one end, the socket having a continuous cylindrical wall, an inner fluid carrying section extending into the socket in the outer section, and bearing means rotatably supporting the inner section in the outer section including a sleeve in the socket fitting the wall thereof and engaged around the inner section, balls between the sleeve and inner section, the balls being supported directly on the inner section and the sleeve having a lateral opening for passing the balls, and a plug confined in the opening retaining the balls in the sleeve, the inner section and sleeve being formed of wear resisting material.

2. A fluid connection of the character described including, an outer section having a socket portion, an inner section extending into the socket portion, a sleeve in the socket portion and surrounding the inner section, balls between the sleeve and inner section, the socket portion having a counterbore of reduced diameter at its inner end closed by the inner end portion of the sleeve, an extension of reduced diameter on the inner section extending into the counterbore and packing on the extension and sealing in the counterbore and supported axially of the connection by the sleeve, the packing being confined to the counterbore by the inner end portion of the sleeve.

3. A fluid connection of the character described including, an outer section having a socket portion, an inner section extending into the socket portion, a ring in the socket portion and surrounding the inner section, balls between the ring and inner section directly engaging the inner section, the socket portion having a counterbore of reduced diameter at its inner end, an inwardly extending flange on the inner end of the ring closing the counterbore, an extension of reduced diameter on the inner section extending into the counterbore and packing on the extension and sealing in the counterbore, the packing being confined to the extension by the ring and being in the form of a ring around the extension and being round in cross section.

DOYLE WARREN.

REFERENCES CITED

The following references are of record in the file of this patent:

UNITED STATES PATENTS

| Number | Name | Date |
|---|---|---|
| 2,269,431 | Allen | Jan. 13, 1942 |
| 2,312,341 | King | Mar. 2, 1943 |
| 2,331,615 | Meyer | Oct. 12, 1943 |
| 2,354,416 | Phillips | July 25, 1944 |